(12) United States Patent
Murakami et al.

(10) Patent No.: US 7,163,125 B2
(45) Date of Patent: Jan. 16, 2007

(54) CARAFE WITH CONTENTS VOLUME INDICATOR

(75) Inventors: Yasuhiro Murakami, Elk Grove Village, IL (US); Masato Hirose, Itasca, IL (US)

(73) Assignee: Thermos L.L.C., Rolling Meadows, IL (US)

( * ) Notice: Subject to any disclaimer, the term of this patent is extended or adjusted under 35 U.S.C. 154(b) by 404 days.

(21) Appl. No.: 10/719,115

(22) Filed: Nov. 21, 2003

(65) Prior Publication Data

US 2005/0109794 A1 May 26, 2005

(51) Int. Cl.
*B67D 5/22* (2006.01)

(52) U.S. Cl. .................. 222/51; 222/131; 222/156; 222/183; 222/321.7; 222/383.1; 220/592.21; 220/592.27; 215/230

(58) Field of Classification Search ............... 222/51, 222/131, 156, 183, 321.7, 383.1, 401, 209; 99/285, 472; 215/391, 230, 228, 365; 220/662, 220/592.16, 592.18, 592.21, 62.12, 62.18
See application file for complete search history.

(56) References Cited

U.S. PATENT DOCUMENTS

| | | | | |
|---|---|---|---|---|
| 3,774,603 A | * | 11/1973 | McPhee | 604/246 |
| 3,905,520 A | * | 9/1975 | Nishioka | 222/209 |
| 4,113,147 A | * | 9/1978 | Frazier et al. | 222/131 |
| 4,116,366 A | * | 9/1978 | Takenakashima et al. | 222/131 |
| 4,274,562 A | * | 6/1981 | Medeiros et al. | 222/401 |
| 4,359,174 A | * | 11/1982 | Ikunosuke et al. | 222/131 |
| 4,735,345 A | * | 4/1988 | Lee | 222/131 |
| 5,649,471 A | * | 7/1997 | Heynderickx et al. | 99/285 |
| 5,653,362 A | * | 8/1997 | Patel | 222/156 |
| 6,119,900 A | * | 9/2000 | Iwamoto et al. | 222/209 |
| 6,301,961 B1 | * | 10/2001 | Rolfes et al. | 73/328 |

OTHER PUBLICATIONS

PCT WO 95/00434 Drink-Dispensing Devise, Konig, Harald, Jan. 5, 1995.*

* cited by examiner

*Primary Examiner*—Patrick Brinson
(74) *Attorney, Agent, or Firm*—Wood, Phillips, Katz, Clark & Mortimer

(57) ABSTRACT

An inexpensive, readily visible indicator for liquid levels in a vacuum bottle that includes a coating of reflective material to minimize radiation heat transfer from the interior of the vacuum bottle to the exterior of the assembly. The vacuum bottle assembly includes a container receiving the vacuum bottle and a transparent or translucent window is located in the side wall of the container and in alignment with an interruption in the reflective coating. An indicator is located within the vacuum bottle and is aligned with both the windows and the interruption so as to be visible therethrough to provide an indication of the level of the liquid contained within the inner liner of the vacuum bottle.

23 Claims, 6 Drawing Sheets

MAXIMUM WIDTH

Fig. 9
Fig. 10
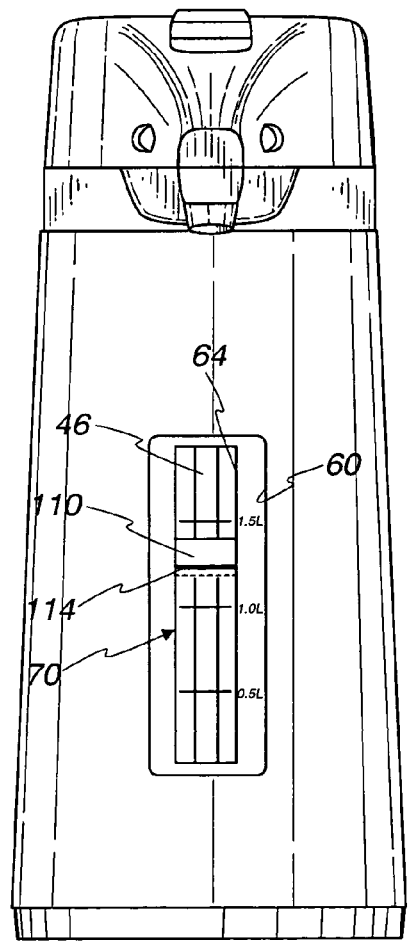
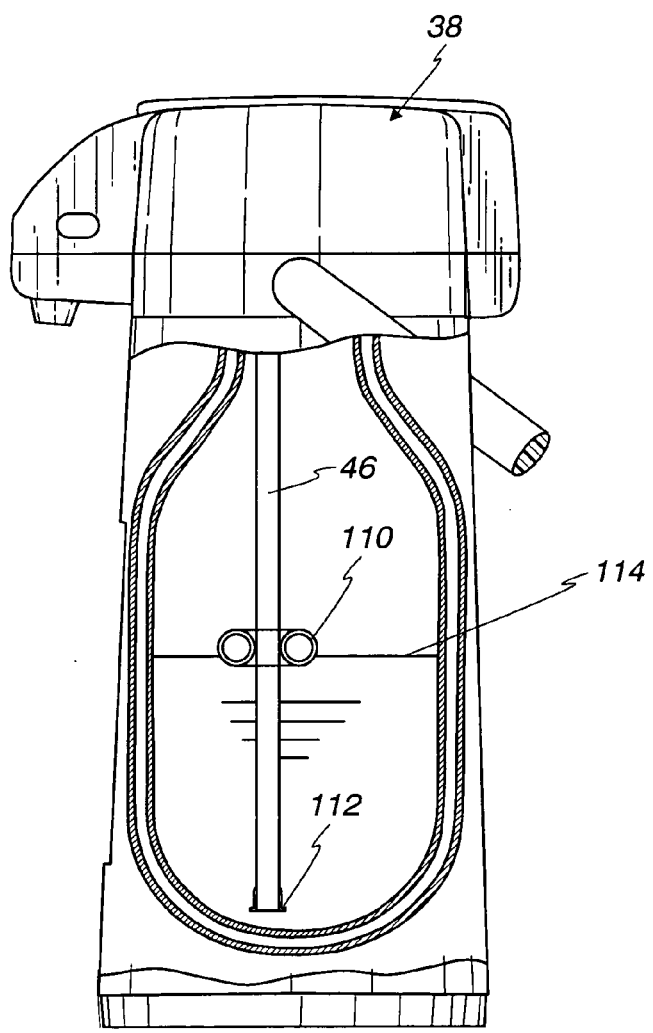

CARAFE WITH CONTENTS VOLUME INDICATOR

FIELD OF THE INVENTION

This invention relates to carafes, and more specifically, to carafes of the so-called "pump pot" type.

BACKGROUND OF THE INVENTION

Most high quality carafes available today include a vacuum insulated glass filler or vacuum bottle. The vacuum bottle, as is well known, is made of an inner liner surrounding by an outer body base relation thereto so as to define a vacuum space. The outer body is sealed to the inner liner to maintain the vacuum and typically, one or more of the outside body and the inside liner, usually the inside liner, is provided with a radiation reflective coating, such as silver plating, to minimize heat lost through radiation. The vacuum bottle thus constructed is in turn housed in a protective container that will typically will have a bottom and an upstanding side wall with a more or less decorative surface and which terminates in a dispensing opening in fluid communication with the interior of the vacuum bottle.

In some cases, a simple stopper and spout assembly will provide the dispensing outlet for the contents of the carafe. In other cases, as for example, in so called "pump pots", a pumping mechanism is provided in a removable stopper that includes a conduit that extends downwardly into the bottom of the inner liner. By operating a pump contained in the stopper, the interior of the inner liner may be pressurized to expel liquid through the conduit to the dispensing opening.

In either case, the level of liquid within the vacuum bottle cannot be readily judged when the stopper is in place and even with it is removed, the reflective covering makes an accurate determination difficult.

There have, therefore, been a number of proposals for providing a means for ascertaining the quantity of the contents of such a carafe without removing the stopper. For example, Japanese Utility Model No. 2,515,492 provides a conventional pump pot assembly, additionally having an opening near the center of the bottom of the inner liner vacuum bottle. A transparent pipe is connected to such opening and extends vertically along the exterior of the vacuum bottle. The pipe may be viewed through an appropriate window in the outer container and the level of liquid in the carafe ascertained. Another example is illustrated in Japanese Patent Publication No. S61-160830 which is quite similar to the previously identified Japanese utility patent. Users of both of these structures experience difficulty in cleaning the pipe that provides the indication of liquid level. Furthermore, they are complicated to manufacture and accordingly expensive because of the special need to provide openings in the bottom of the vacuum bottle as well as the provision of several additional parts that are necessary to connect the level gauge constituted by the glass pipe to a dispensing opening and to the interior vacuum bottle.

Another proposal is found in Japanese Published Patent Application No. 2002-68324 wherein part of the vacuum bottle is not silvered so that one may view the contents of the vacuum bottle through the non-silvered portion. In order to determine the level of liquid within the vacuum bottle, the same must be in bright light condition or else the stopper must be removed to allow sufficient light to enter the vacuum bottle through the upper opening and/or the unsilvered portion to provide sufficient illumination to accurately judge the liquid level.

Thus, there is a real need for a carafe of the type utilizing a silvered vacuum bottle for insulation purposes that allows an accurate determination of the fill level of the vacuum bottle under widely varying light conditions and provides the ability to do that in an inexpensive construction that does not require the provision of additional holes in the vacuum bottle and eliminates the need for a considerable number of additional parts associated therewith.

SUMMARY OF THE INVENTION

It is the principal object of the invention to provide a new and improved carafe that includes provision for accurately determining the level of the contents within the carafe. More specifically, it is an object of the invention to provide such a carafe of the type that includes a vacuum bottle for insulating purposes, which vacuum bottle is provided with a radiation reflective coating to maximize its efficiency. It is particularly an object of the invention to provide such a carafe with an accurate low cost, level indicating means whereby the level of the contents of the carafe may be accurately determined without removal of a stopper or the like and in varying light conditions.

An exemplary embodiment of the invention achieves the foregoing objects in a vacuum bottle assembly for use in dispensing beverages which include a vacuum bottle having an inner liner, an outer body about the inner liner in spaced relation thereto and sealed to the inner liner to define a vacuum space between the outer body and the inner liner. The outer body and the inner liner are formed of a transparent or translucent material and a covering of reflective material is located on at least one of the outer body and the inner liner to minimize radiation heat transfer between the interior of the inner liner and the exterior of the outer body. A container is provided that has a bottom and an upstanding side wall terminating in a dispensing outlet which is remote from its bottom. The container receives and houses the vacuum bottle. A transparent or translucent window is located in the side wall of the container and extends upwardly from a lower location at or above the bottom of the container to an upper location at or below the dispensing outlet. An interruption is placed in the reflective material covering the vacuum bottle which is of a size and shape roughly approximating that of the window and which is aligned therewith. An indicator is disposed within the vacuum bottle which is of a color that contrasts with the color of a liquid contained within the inner liner and is aligned with both the window and the interruption so as to be visible therethrough to provide an indication of the level of a liquid contained within the inner liner.

In a preferred embodiment, the indicator is at a fixed location within the vacuum bottle.

In a highly preferred embodiment, a level/volume scale is associated with one or the other of the window and the indicator.

In one embodiment, the indicator is disposed within the inner liner and is movable therein. In such an embodiment, the indicator may be a float.

In a highly preferred embodiment, the indicator is removably received within the inner liner so as to be removable from the assembly for washing.

The invention also contemplates a pump pot including generally the features mentioned previously and further including a pump mechanism removably mounted on the container at the dispensing outlet. The pump mechanism has a conduit extending downwardly into the inner liner to or towards the bottom thereof in close proximity to and in alignment with the interruption through which a liquid in the inner liner may be pumped to be dispensed at the dispensing outlet. The indicator is within the inner liner and is carried by the conduit in alignment with the window and the interruption. The indicator is of an color that contrasts with the color of a liquid so as to be visible through the interruption and the window to provide an indication of the level of a liquid contained within the inner liner.

In an preferred embodiment, the indicator is removable from the inner liner with the pump mechanism for cleaning.

In one embodiment, the indicator is a vertically elongated colored surface on the conduit generally facing the interruption.

In one embodiment, the colored surface is an exterior surface of the conduit while in another embodiment, the colored surface is a face surface of an element attached to the conduit.

In preferred embodiments of the invention, the colored surface is at least as wide as the window and/or the interruption and has height at least as great as the window and/or interruption.

In a preferred embodiment, the vacuum bottle has a relatively small neck at its upper end with an opening therein through which the conduit of the pump mechanism is received and a flared mid-section wherein the interruption is located. The conduit, intermediate its ends is displaced towards the interruption and provided with an indicator carrying section that is close to or nominally parallel with the interruption.

In a highly preferred embodiment, the indicator section has a height and width at least as great as the heights and widths of the interruption and the windows.

Other objects and advantages will become apparent from the following specification taken in connection with the accompanying drawings.

DESCRIPTION OF THE DRAWINGS

FIG. 9 is a front elevation of still another embodiment of the invention; and FIG. 10 is a side elevation of the embodiment of FIG. 9 with parts broken away for clarity.

DESCRIPTION OF THE PREFERRED EMBODIMENTS

Exemplary embodiments of the invention will be described in the environment of a so-called "pump pot" type of carafe for dispensing beverages. However, it is to be understood that the invention may be used with utility in other types of carafes and/or vacuum bottle assemblies of the type having an internal vacuum bottle made of a transparent or translucent inner liner and outer body, one or both of which is coated with reflective material for the purpose of minimizing heat loss from the interior of the vacuum bottle to the exterior thereof by a radiation heat transfer. Thus, no limitation to pump pot types of carafe is intended except insofar as expressly stated in the appended claims.

Figure 1:
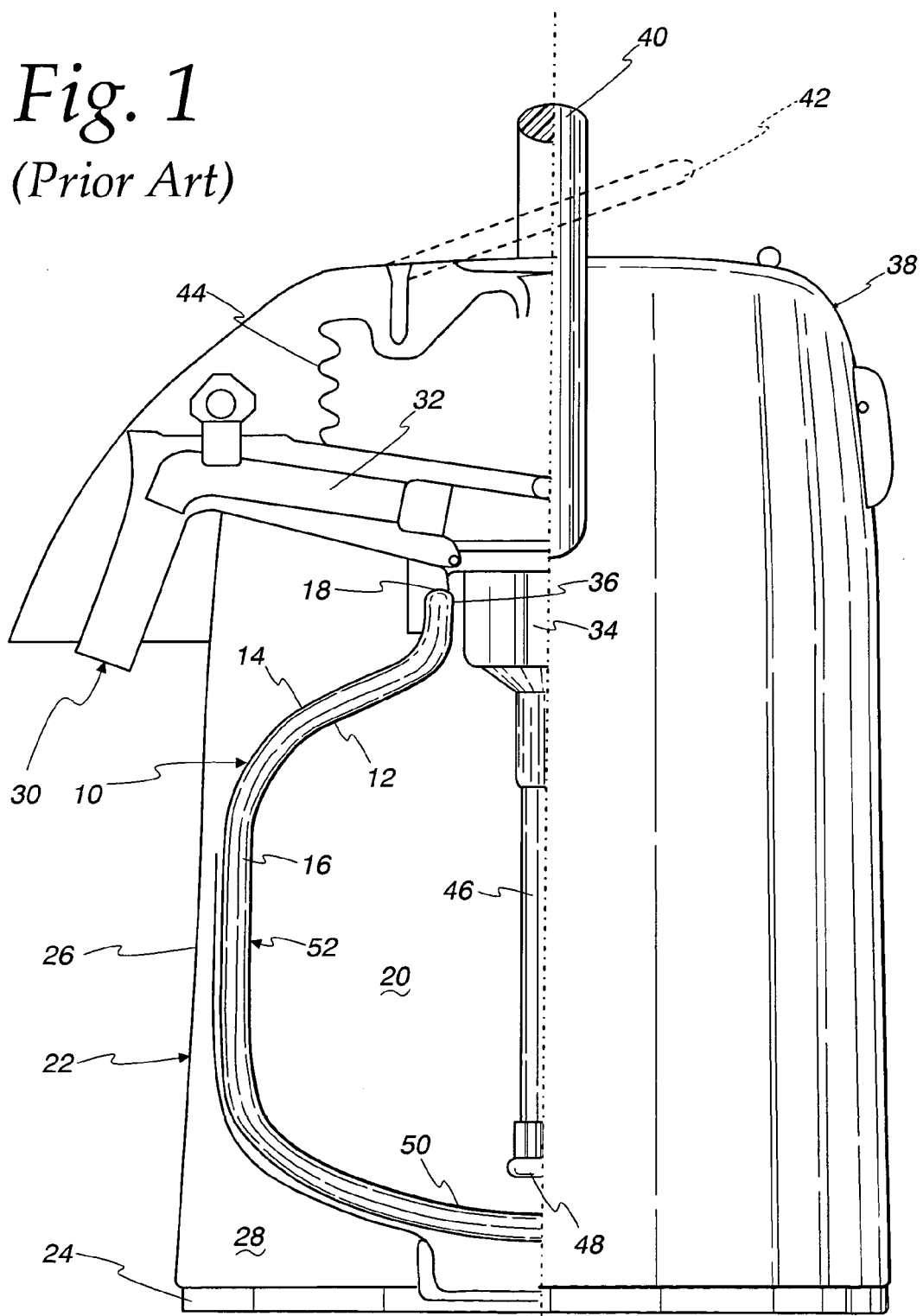
FIG. 1 is a side elevation of a pump pot carafe made according to the prior art with parts broken away for clarity.

Turning now to FIG. 1, a conventional pump pot carafe is illustrated and seen to include a vacuum bottle, generally designated 10, including an inner liner 12 surrounded by an outer body 14 with a vacuum space 16 between the two. In the usual case, the inner liner 12 and the outer body 14 are joined at their upper ends as shown at 18 to seal the space 16 and are formed of a translucent or transparent material, typically glass. In addition, although not shown in FIG. 1, a reflective coating will be placed on either on the exterior surface of the inner liner 17 or the interior surface of the outer body 14 or both. The reflective coating is intended to minimize heat transfer from the interior 20 of the vacuum bottle 10 to the exterior thereof as a result of radiation heat transfer.

A container, generally designated 22, typically having a decorative outer surface includes a bottom or base 24 and a upstanding side wall 26 to define a container interior 28 in which the vacuum bottle 10 is received. Near its upper end, the container 22 includes a dispensing outlet, generally designated 30, which is in fluid communication with a nozzle 32 on a stopper 34 that seals an upper opening 36 in the vacuum bottle 10.

The dispensing opening 30 is part of a pump head unit, generally designated 38, which may be provided with a stowable handle 40. Within the pump head unit 38 is a conventional pumping unit 38 which typically includes a bellows 41 and an operating lever 42 for compressing the bellows 41 in a known fashion. Valves, not shown, are provided in a conventional fashion for the bellows 41 so that when the lever 42 is pressed, air will be driven through the stopper 34 into the interior of the vacuum bottle 10 to compress the contents thereof. When the bellows 41 is allowed to expand, it will refill with air for a further pumping stroke.

The stopper 34 includes a downwardly extending conduit 46 which extends into the interior 20 of the vacuum bottle to terminate at an end 48 in close proximity through the bottom 50 of the inner liner 12.

The pump head unit 38 is conventionally attached to the upper end of the container 22 in a removable fashion as, for example, by threads or bayonet slots or the like. The stopper 34 is conventionally connected to the head 38 as is the conduit 46 so that when the head 36 is removed, all of the components may be readily cleaned.

In operation, compression of air by the bellows 41 and the injection of the same into the interior 20 of the vacuum bottle 10 will cause the contents of the vacuum bottle 10 to be pressurized up through the conduit 46 into the nozzle 32 to flow to the dis-pensing opening 30 to be discharged into another container as, for example, a cup or glass.

Finally, it will be noted that the vacuum bottle, intermediate its bottom 50 and the location 18 where the inner liner 12 and the outer body 14 are joined is radially outwardly flared as generally shown at 52. This maximizes the capacity of the interior 20 of the vacuum bottle 10 as well as the vacuum insulated part of the vacuum bottle 10 as well.

The components thus far described are conventional and the manner of their fabrication is well known and forms no part of the present invention.

Before proceeding to describe the invention in connection with FIGS. 2–10, inclusive, it should, be noted that in the interest of brevity, conventional components heretofore described will not be redescribed. Additionally, those components will be given the same reference numerals in FIGS. 2–10, as given in the corresponding components in FIG. 1.

Figure 2:
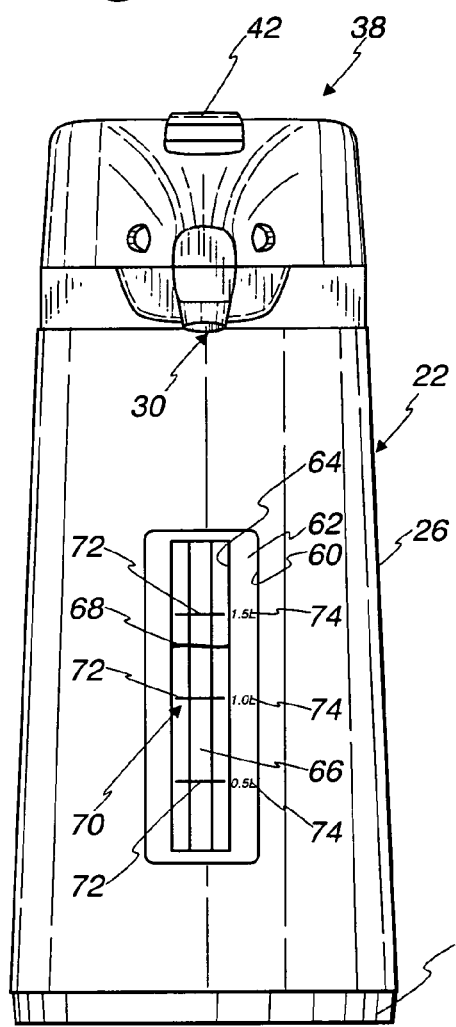
FIG. 2 is a front elevation of a carafe made according to the invention.
Figure 3:
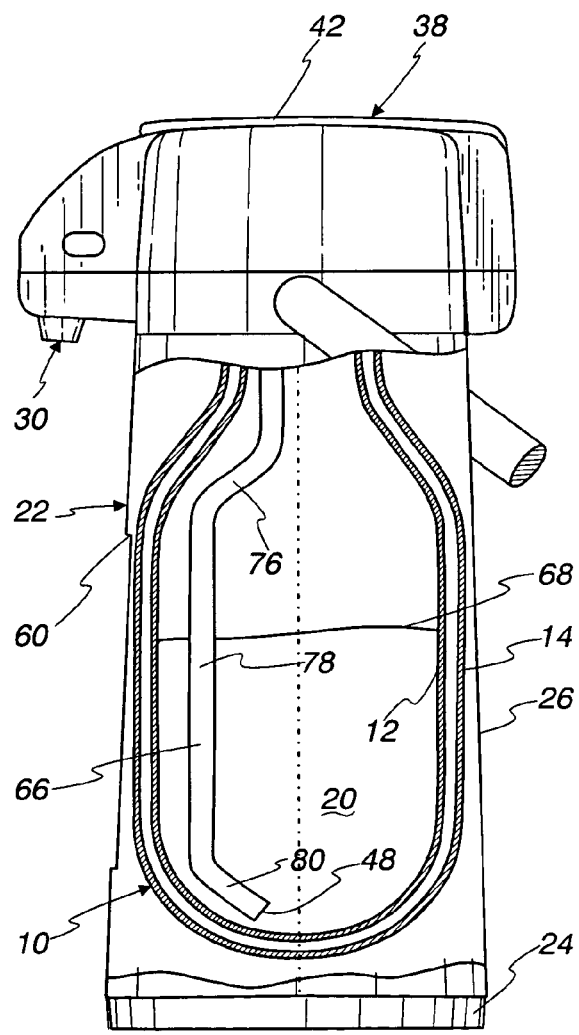
FIG. 3 is a side elevation of the carafe illustrated in FIG. 2 with parts broken away for clarity.

Turning to FIGS. 2 and 3, a first embodiment of the invention is shown. In this embodiment, the upstanding side wall 26 of the container 22 is provided with a window 60 which typically will be provided with a transparent or even translucent cover. Through the window 60 the reflective coating 62 referred to generally earlier may be shown and it will be seen that the same includes an interruption 64, that is, an absence of reflective coating, in alignment with the window 60. Consequently, through the window 60 and the interruption 64, a conduit 66 also aligned with the window 60 and the interruption 64, and corresponding in function of the conduit 46, may be seen. And, of course, the liquid level within the vacuum bottle 10 can likewise be seen. In FIGS. 2 and 3, such a liquid level is illustrated at 68.

A scale, generally designated 70 is associated with the window 60, the interruption 64 or even the conduit 66 as desired and includes hash marks 72 in a vertically spaced relation together with associated indicia 74 by which the volume represented by the liquid level 68 can be assessed.

As shown in FIG. 3, the conduit 66 varies from the conduit 46 in that it has an offset shown at 76 to bring a vertically extending part 78 of the conduit 66 into close proximity to the interruption 64 in the reflective coating 62. A further offset 80 brings the bottom 48 of the conduit 66 towards the center of the space 20 near the bottom thereof as seen in FIG. 3.

Figure 6:
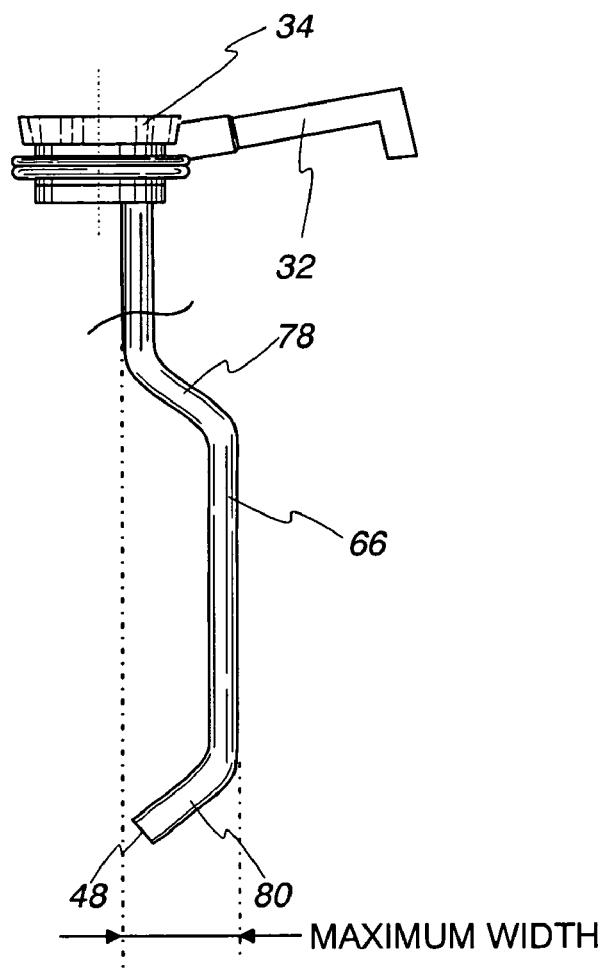
FIG. 6 is a elevation of a conduit and related components used in one embodiment of the invention.

In the usual case, the conduit 66 is removably mounted on the stopper 34 and is in fluid communication with the nozzle 32 as illustrated in FIG. 6.

Preferably, in this embodiment of the invention, the conduit 66 is formed to contrast with the liquid that would be contained within the space 20 of the vacuum bottle 10. Contrast can be obtained by differences in surface texture or color but preferably, is obtained by utilizing a bright color on the exterior surface of the conduit 66 and, especially, that part of the conduit 66 that faces the window 60. Further, the threads or bayonet slots utilize to attach the pump head unit 38 to the container 22 are configured as so when pump head unit 38 is fully tightened in place, the offset section 78 will be in close proximity to and aligned with the window 60, as well as the interruption 64 as shown in FIGS. 2 and 3.

While the contrast may be obscured on that part of the conduit 66 that is below the level 68 of the liquid, that part of the conduit 66 above such level will be plainly visible. A color that may be used, for example, includes an extremely bright color as for example, blaze orange, lime green, etc.

Figure 4:
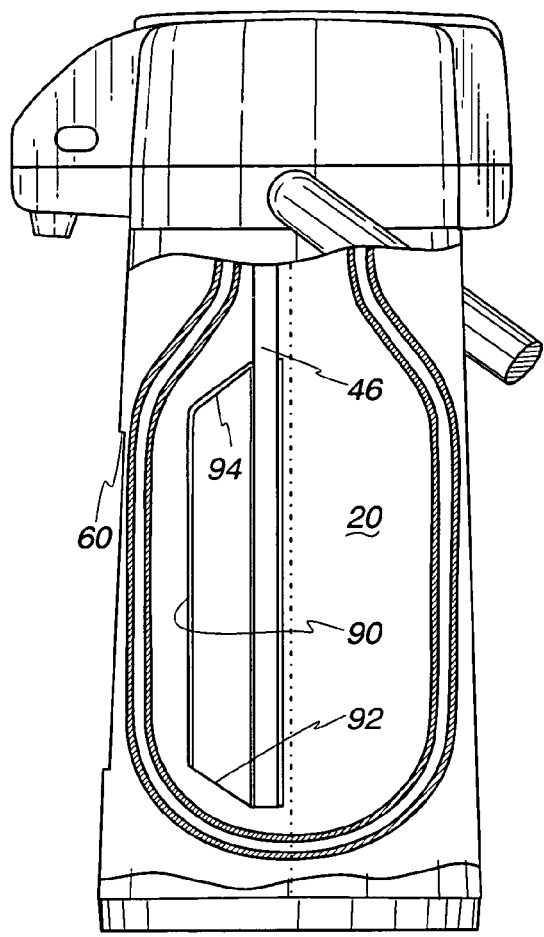
FIG. 4 is a view similar to FIG. 3 but of a modified embodiment of the invention.
Figure 5:
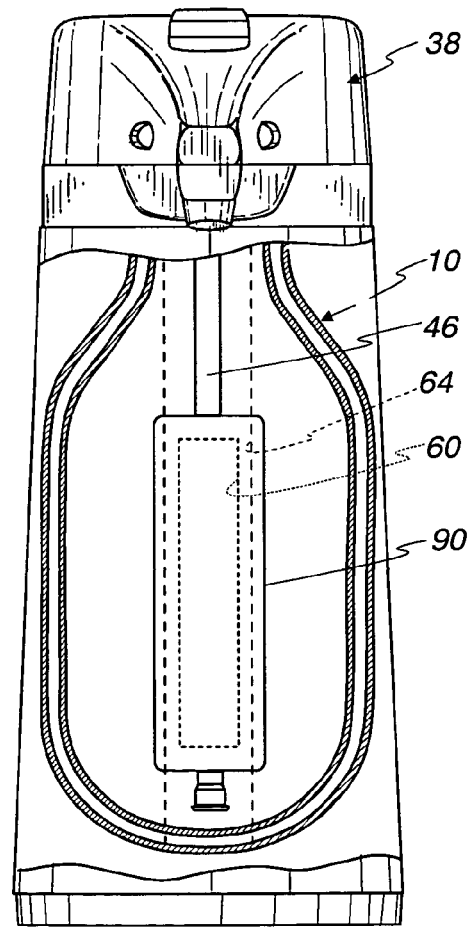
FIG. 5 is a front elevation of the embodiment of FIG. 4 with parts broken away for clarity.
Figure 8:
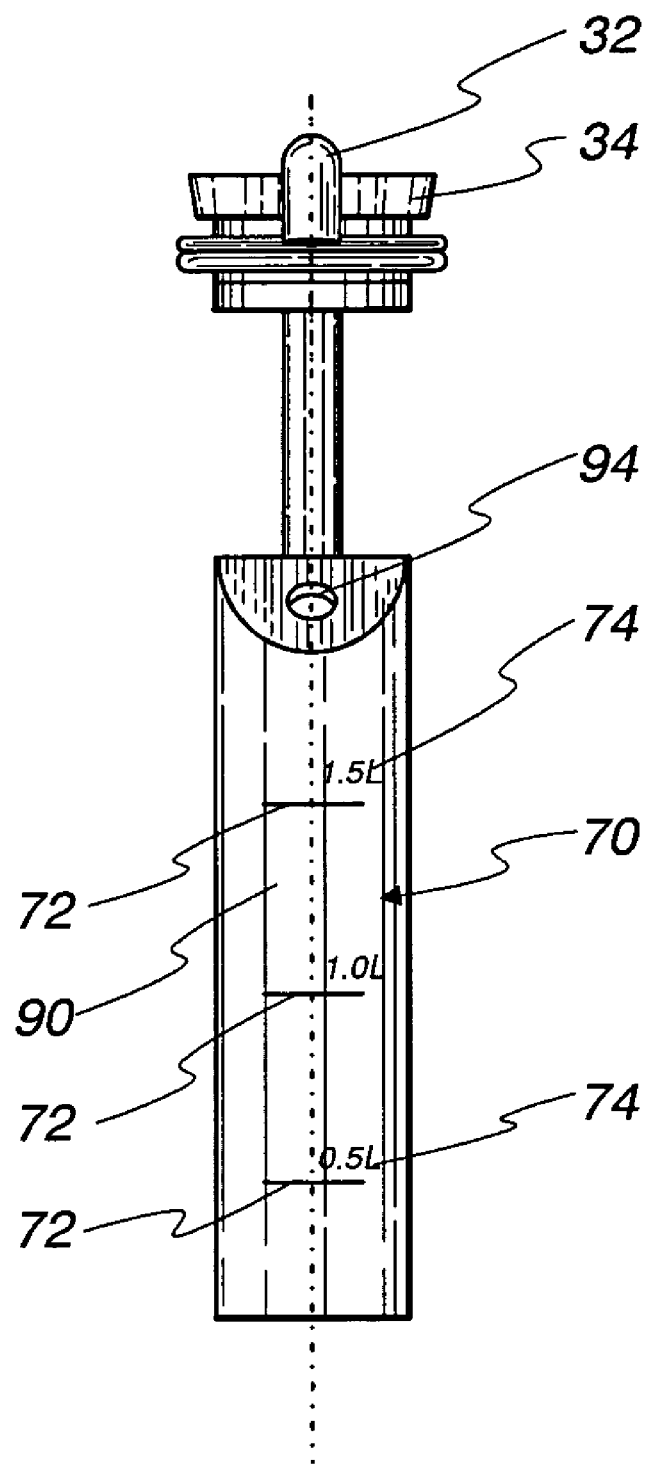
FIG. 8 is a view similar to FIGS. 6 and 7 but of still another embodiment of the invention.

A further embodiment is illustrated in FIGS. 4, 5 and 8. In this embodiment, a conduit such as the conduit 46 may be used which is to say, a straight conduit may be employed. A separate component, typically of a cylindrical shape may be mounted in an offset fashion on the conduit 46 so as to present an enlarged indicator aligned with and facing surface 90 the interruption and the aligned window 60 as shown in FIG. 4. In this embodiment, the indicator surface 90 will have its bottom open as shown at 92 and a vent hole 94 at the top so as not to diminish volume that can be contained within the interior 20 of the vacuum bottle 10. Again, the surface 90 or the window, or even the interruption 64 will be provided with the scale 70. The indicator surface 90 has a diameter just less than that of the bottle opening 36 so as to be removable received in the bottle 10. FIG. 5 illustrates the relationship between the indicator 90, the window 60 and the interruption 64. It will be seen that the same are roughly equal in size. In particular, the indicator 90 is of a slightly greater width than the interruption 64 with the interruption 64 extending from top to bottom of the vacuum bottle 10, principally for ease of manufacturing. Alternatively, in some embodiments, it may be desirable for the interruption 64 not to extend completely to the top of the vacuum bottle 10, or not to extend completely to the bottom of the vacuum bottle 10, or both, depending on the particular requirements of the application, including manufacturing requirements. The window 60 is slightly narrower than the interruption 64 and is slightly shorter than the indicator 90.

FIG. 8 shows the embodiment of FIGS. 4 and 5 and particularly the stopper 34, the nozzle 32 and the indicator 90 together with hash marks 72 and indicia 74 located thereon. The hash marks 72 and indicia 74 may be placed on the indicator 90 of this embodiment or on any of the other embodiments, by printing, multi-shot molding, laser marking or the like.

Figure 7:
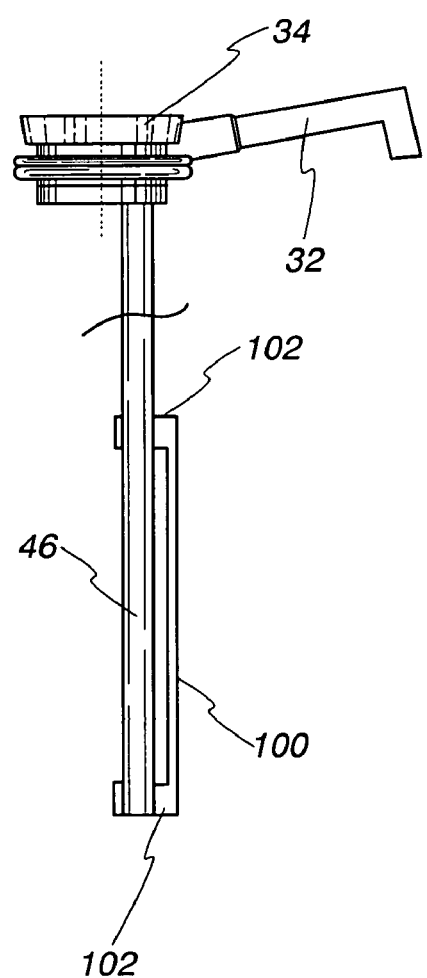
FIG. 7 is a view similar to FIG. 6 but of another embodiment of the invention.

Still another embodiment is illustrated in FIG. 7. This embodiment is similar to that shown in FIGS. 4, 5, and 8 and simply includes a flat plate like structure 100 in place of the indicator 90. Collars 102 on opposite ends of the plate 100, secure the plate 100 to the conduit 46.

It is to be noted that in all of the embodiments described thus far as well as that to be described, the cross sectional shape of the conduit 46 or 66 with the indicating surfaces 90, 100 mounted thereon is of a shape such that it will fit through the upper opening of the vacuum bottle so that the same may be removed with the pump head for ease of cleaning.

FIGS. 9 and 10 show a further embodiment of the invention. In this embodiment, a window 60 and an interruption 64 are identical to or similar to the corresponding components described previously in connection with FIG. 2. On the other hand, the conduit 46 is straight as in the embodiments FIGS. 4, 5, 7, and 8 and do not include the offset that is found in the conduit 66. A doughnut like float 110 is fitted about the conduit 46 and a stop 112 located at the lower end of he conduit 46 to retain the float 110 on the conduit 46. The float 110 serves as the indicator in this embodiment and again, will typically contrast with the liquid in the carafe at whose level is shown at 114 in FIGS. 9 and 10. In this embodiment, the outer diameter of the float 110 is sufficiently small as to fit into the vacuum bottle 10 through its upper opening 36 but sufficiently large so as to span the distance between the sides of the interruption 64.

Those skilled in the art will readily appreciate that the various embodiments of the invention provide a simple and inexpensive means for providing an accurate indication of the contents of the vacuum bottle 10. No special attachments to the vacuum bottle are required and the indicating system may be readily removed with the pump head unit 38 for cleaning. Furthermore, the contrast between the indicator and the liquid 114, which preferably, but not always, will be a contrasting color, allows ready visibility through the interruption 64 in the reflective coating of the vacuum bottle. Because of the contrast, reflections of the liquid appearance from the reflective coating do not interfere with the visual determination of volume of liquid in the vacuum bottle 10.

The invention claimed is:

1. A vacuum bottle assembly for use in dispensing beverages comprising
   a vacuum bottle having an inner liner, an outer body about said inner liner in spaced relation thereto and sealed to the inner liner to define a vacuum space between said outer body and said inner liner, said outer body and said inner liner being formed of a transparent or translucent material and a covering of reflective material on at least one of said outer body and said inner liner to minimize radiation heat transfer between the interior of said inner liner and the exterior of said outer body;

a container having a bottom, and an upstanding side wall terminating in a dispensing outlet remote from said bottom, said container receiving and housing said vacuum bottle;

a transparent or translucent window in said side wall extending upwardly from a lower location at or above said bottom to an upper location at or below said dispensing outlet;

an interruption in said reflective material covering on said vacuum bottle aligned with said window; and an indicator within said inner liner and aligned with both said window and said interruption so as to be visible therethrough to provide an indication of the level of a liquid contained within said inner liner.

2. The vacuum bottle assembly of claim 1 wherein said indicator is at a fixed location within said vacuum bottle.

3. The vacuum bottle assembly of claim 2 further include a level/volume scale associated with one of said window and said indicator.

4. The vacuum bottle assembly of claim 1 wherein said indicator is within said inner liner and is movable therein.

5. The vacuum bottle assembly of claim 4 wherein said indicator is a float.

6. The vacuum bottle assembly of claim 1 wherein said indicator is removably received within said inner liner so as to be removable from said assembly for washing.

7. The vacuum bottle assembly of claim 1 wherein said indicator is of a color that contrasts with the color of liquid contained within said inner liner.

8. A vacuum bottle assembly for use in dispensing beverages comprising a vacuum bottle having an inner liner, an outer body about said inner liner in spaced relation thereto and sealed to the inner liner to define a vacuum space between said outer body and said inner liner, said outer body and said inner liner being formed of a transparent or translucent material and a covering of reflective material on at least one of said outer body and said inner liner to minimize radiation heat transfer between the interior of said inner liner and the extension of said outer body;

a container having a bottom, and an upstanding side wall terminating in a dispensing outlet remote from said bottom, said container receiving and housing said vacuum bottle;

a transparent or translucent window in said side wall extending upwardly from a lower location at or above said bottom to an upper location at or below said dispensing outlet;

an interruption in said reflective material covering on said vacuum bottle aligned with said window;

a pump mechanism removably mounted on said container at said dispensing outlet and having a conduit extending downwardly into said inner liner to or toward a bottom thereof in close proximity to and alignment with said interruption through which a liquid in said inner liner may be pumped to be dispensed at said dispensing outlet; and an indicator within said inner liner and carried by said conduit in alignment with said window and said interruption, said indicator contrasting with a liquid within said inner liner so as to be visible through said interruption and said window to provide an indication of the level of a liquid contained within said inner liner.

9. The vacuum bottle assembly of claim 8 wherein said indicator is of a color that contrasts with the color of liquid contained within said inner liner.

10. The vacuum bottle assembly of claim 9 wherein said indicator is removable from said inner liner with said pump mechanism for washing.

11. The vacuum bottle assembly of claim 10 wherein said indicator is a float movably mounted on said conduit.

12. The vacuum bottle assembly of claim 10 wherein said indicator is a vertically elongated colored surface on said conduit generally facing interruption.

13. The vacuum bottle assembly of claim 12 wherein said colored surface is an exterior surface of said conduit.

14. The vacuum bottle assembly of claim 12 wherein said colored surface is a face surface of an element attached to said conduit.

15. The vacuum bottle assembly of claim 12 wherein said colored surface is at least as wide as said window.

16. The vacuum bottle assembly of claim 15 wherein said interruption is at least as wide as said window.

17. The vacuum bottle assembly of claim 8 wherein said interruption is at least as wide as said window.

18. The vacuum bottle assembly of claim 8 wherein said indicator is vertically elongated and has a height at least equal to that of said window.

19. The vacuum bottle assembly of claim 8 wherein said interruption is vertically elongated and has a height at least equal to that of said window.

20. The vacuum bottle assembly of claim 18 wherein said interruption is vertically elongated and has a height at least equal to that of said window.

21. The vacuum bottle assembly of claim 8 further include a level/volume scale associated with one of said window of said indicator.

22. A vacuum bottle assembly for use in dispensing beverages comprising a vacuum bottle having an inner liner, an outer body about said inner liner in spaced relation thereto and sealed to the inner liner to define a vacuum space between said outer body and said inner liner, said outer body and said inner liner being formed of a transparent or translucent material and a covering of reflective material on at least one of said outer body and said inner liner to minimize radiation heat transfer between the interior of said inner liner and the exterior of said outer body;

a container having a bottom, and an upstanding side wall terminating in a dispensing outlet remote from said bottom, said container receiving and housing said vacuum bottle;

a transparent or translucent window in said side wall extending upwardly from a lower location at or above said bottom to an upper location at or below said dispensing outlet;

an interruption in said reflective material covering on said vacuum bottle of a size and shape roughly approximating or larger than said window and aligned therewith;

a pump mechanism removably mounted on said container at said dispensing outlet and having a conduit extending downwardly into said inner liner to or toward a bottom thereof in close proximity to and in alignment with said interruption through which a liquid in said inner liner may be pumped to be dispensed at said dispensing outlet; and an indicator within said inner liner and carried by said conduit in alignment with said window and said interruption, said indicator being of a color that contrasts with the color of a liquid within said inner liner so as to be visible through said interruption and said window to provide an indication of the level of a liquid contained within said inner liner;

said vacuum bottle having a relatively small neck at its upper end with an opening therein through which said conduit is received and a flared mid-section wherein said interruption is located, said conduit, intermediate its ends being displaced toward said interruption and provided with an indicator carrying section that is close to and nominally parallel to said interruption.

23. The vacuum bottle assembly of claim 22 wherein said indicator section has a height and width at least as great as the heights and widths of said interruption and said windows.

* * * * *